United States Patent
Lee

(10) Patent No.: US 7,557,526 B2
(45) Date of Patent: Jul. 7, 2009

(54) BRUSHLESS MOTOR CONTROL CIRCUIT ASSEMBLY FOR CEILING FAN

(75) Inventor: Hsien-Meng Lee, No. 82-1, Jaokuei 1st St., Hsitun Dist., Taichung City (TW)

(73) Assignees: Hsien-Meng Lee, Taichung (TW); Air Cool Industrial Co., Ltd., Taichung County (TW)

(*) Notice: Subject to any disclaimer, the term of this patent is extended or adjusted under 35 U.S.C. 154(b) by 229 days.

(21) Appl. No.: 11/808,141

(22) Filed: Jun. 7, 2007

(65) Prior Publication Data

US 2008/0304815 A1 Dec. 11, 2008

(51) Int. Cl.
*H02P 6/00* (2006.01)
*H02P 6/14* (2006.01)
*H02P 6/16* (2006.01)
*H02P 6/18* (2006.01)

(52) U.S. Cl. ............. 318/400.01; 318/264; 318/400.34; 318/400.35; 388/815

(58) Field of Classification Search ................. 318/264, 318/400.01, 400.34, 400.35; 388/815
See application file for complete search history.

(56) References Cited

U.S. PATENT DOCUMENTS

| | | | |
|---|---|---|---|
| 5,349,275 A * | 9/1994 | Muller | 318/400.29 |
| 5,420,486 A * | 5/1995 | Wilson | 388/821 |
| 5,847,530 A * | 12/1998 | Hill | 318/599 |
| RE36,860 E * | 9/2000 | Muller | 318/400.13 |
| 7,157,872 B1 * | 1/2007 | Tang | 318/400.41 |
| 7,196,485 B1 * | 3/2007 | Lee et al. | 318/400.38 |
| 7,400,103 B2 * | 7/2008 | Hofer | 318/276 |
| 7,425,805 B2 * | 9/2008 | Hsu | 318/16 |
| 7,433,164 B2 * | 10/2008 | Chu | 361/23 |
| 2004/0007998 A1 * | 1/2004 | Yasohara et al. | 318/437 |
| 2004/0041530 A1 * | 3/2004 | Peterson | 318/254 |
| 2004/0251860 A1 * | 12/2004 | Ehsani et al. | 318/254 |

\* cited by examiner

*Primary Examiner*—Lincoln Donovan
*Assistant Examiner*—Christina Russell
(74) *Attorney, Agent, or Firm*—Rosenberg, Klein & Lee

(57) ABSTRACT

A power-saving, high-performance, low-noise brushless motor control circuit assembly is disclosed formed of a power supply circuit, a booster and compensation circuit, a voltage regulator circuit, a microprocessor, a back electromagnetic force sensor, three driver circuits, and three output circuits. By means of detecting back electromagnetic force, the magnetic pole position of the brushless motor is known accurately, ensuring accurate operation control. By means of providing a high voltage to drive the drive circuits, the field effect transistors of the output circuits are operated under full conduction, saving much power consumption and lowering the working temperature of the brushless motor.

1 Claim, 3 Drawing Sheets

BRUSHLESS MOTOR CONTROL CIRCUIT ASSEMBLY FOR CEILING FAN

BACKGROUND OF THE INVENTION

1. Field of the Invention

The present invention relates to ceiling fans and more specifically, to a motor control circuit assembly for use in a ceiling fan to control the operation of the brushless motor.

2. Description of the Related Art

In a brushless motor type ceiling fan, a Hall effect sensor used to detect the change of magnetic pole position of the rotor, and a field effect transistor is necessary for output drive. The voltage of the field effect transistor is relatively low, and therefore the field effect transistor is not in "full conduction" for full power mode, i.e., the power factor is at a low level, wasting much electricity and releasing much heat.

Further, PWM (Pulse-width modulation) is commonly used in the control of the speed of a brushless motor in that involves the modulation of its duty cycle to control the amount of power sent to the load. It is used to control the supply of electrical power to the brushless motor, thereby controlling the speed of the brushless motor. However, this control method cannot eliminate vibration of the fan blade during rotation, resulting in a high noise level.

SUMMARY OF THE INVENTION

The present invention has been accomplished under the circumstances in view. It is therefore the main object of the present invention to provide a brushless motor control circuit assembly, which saves much power consumption, and lowers the temperature level of the brushless motor.

To achieve these and other objects of the present invention, the brushless motor control circuit assembly is comprised of a power supply circuit, a booster and compensation circuit, a voltage regulator circuit, a microprocessor, a back electromagnetic force sensor, three driver circuits, and three output circuits. By means of detecting back electromagnetic force, the magnetic pole position of the brushless motor is known accurately, ensuring accurate operation control. By means of providing a high voltage to drive the drive circuits, the field effect transistors of the output circuits are operated under full conduction, saving much power consumption and lowering the working temperature of the brushless motor.

DETAILED DESCRIPTION OF THE PREFERRED EMBODIMENT

Figure 1:
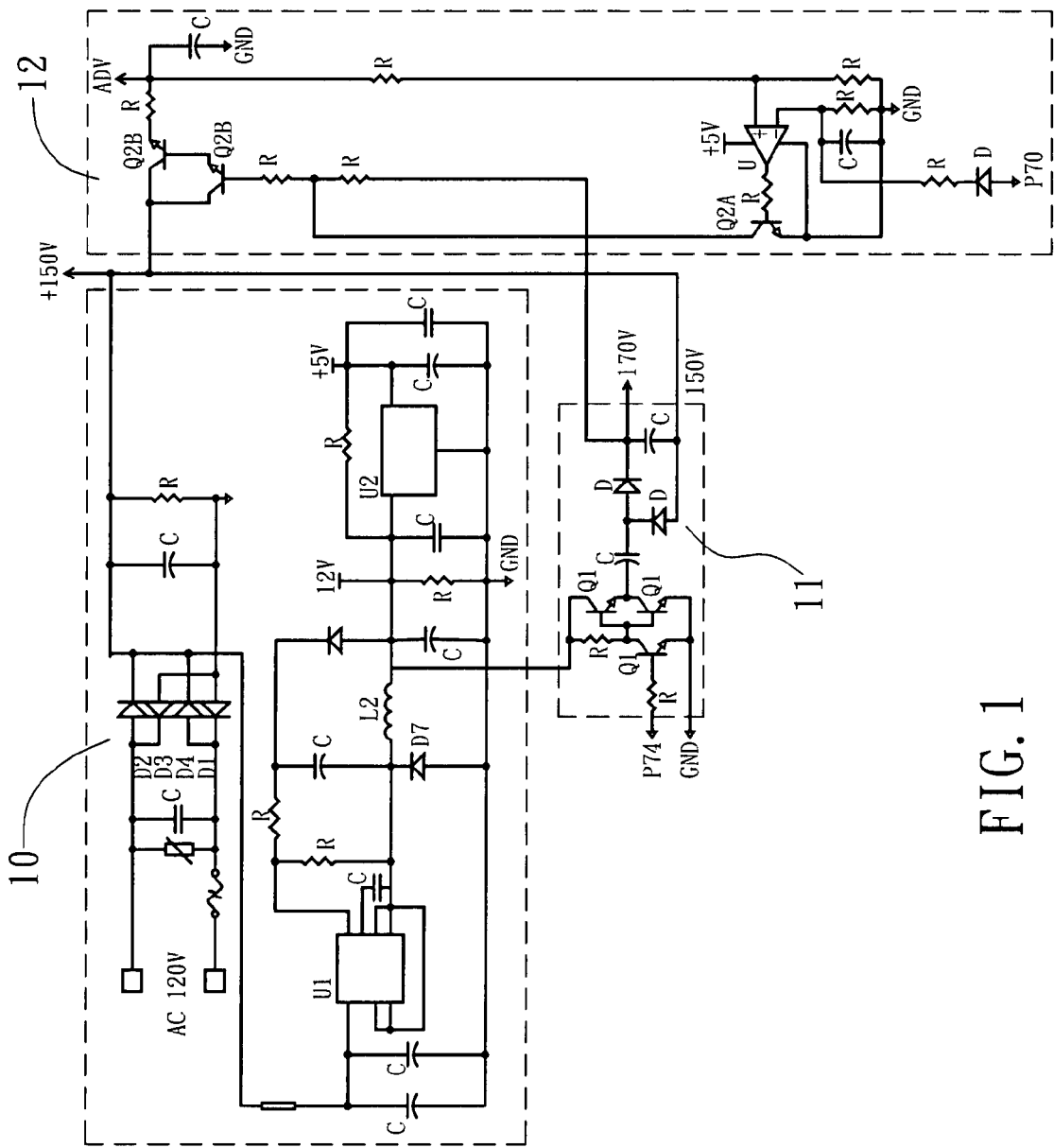
FIG. 1 is a circuit diagram of the circuitry of the power supply circuit, booster and compensation circuit, and voltage regulator circuit of the brushless motor control circuit assembly according to the present invention.

Referring to FIGS. 1~4, a brushless motor control circuit assembly in accordance with the present invention is shown comprised of a power supply circuit 10, a booster and compensation circuit 11, a voltage regulator circuit 12, a microprocessor 20, a back electromagnetic force sensor 30, three driver circuits 40, and three output circuits 50.

The power supply circuit 10 (see FIG. 1) provides low voltage 12V/5V and high voltage 150V for the other circuitries of the brushless motor control circuit assembly.

The microprocessor 20 (see FIG. 2) has memory, computation, signal reading and pulse wave modulation functions, and is adapted to receive external control signals and to output set control signals to the driver circuits 40.

The booster and compensation circuit 11 (see FIG. 1) is comprised of a plurality of transistors Q1, resistors R, capacitors C, and diodes D, and adapted to raise the 12V output voltage of the power supply circuit 10 to 170V for the driver circuits 40 and the field effect transistors QT of the output circuits 50, for full conduction of the field effect transistors QT.

The voltage regulator circuit 12 (see FIG. 1) is comprised of transistors Q2A and Q2B, resistors R, capacitors C, and an operation amplifier U. The reference voltage at the negative input end of the operation amplifier U is obtained from the microprocessor 20. The positive input end of the operation amplifier U is shunt to the regulated voltage output end ADV by resistors R. When the output voltage is higher than the set value, the output of the operation amplifier U becomes high, thereby turning on the transistor Q2A and turning off the transistor Q2B. On the contrary, when the output voltage is lower than the set value, the output of the operation amplifier U becomes low, thereby turning off the transistor Q2A and turning on the transistor Q2B. Therefore, a modulated voltage output is provided at the regulated voltage output end ADV.

The back electromagnetic force sensor 30 (see FIG. 3) is comprised of three operation amplifiers U1, U2 and U3 electrically connected to a brushless motor M and the microprocessor 20 to detect the magnetic pole position of the rotor of the brushless motor M for further control.

The driver circuits 40 and the output circuits 50 (see FIG. 4) are electrically connected with each other. The driver circuits 40 each comprise a plurality of transistors Q3 electrically connected to the microprocessor 20 for enabling the microprocessor 20 to simulate the phase of the brushless motor M and to further control the output of the output circuits 50. The output circuits 50 each comprise a plurality of field effect transistors QT electrically connected to the brushless motor M for outputting control signals to the brushless motor M to control forward/backward/stop modes of the brushless motor M.

When started, the microprocessor 20 outputs a motor phase simulation signal to the driver circuits 40, causing the brushless motor M to be positioned. At this time, the back electromagnetic force sensor 30 detects the magnetic pole position of the rotor of the brushless motor M and provides the detected signal to the microprocessor 20 for controlling the direction of rotation of the brushless motor M. Further, the microprocessor 20 provides a reference voltage to the negative input end of the operation amplifier U by means of PWM (Pulse-width modulation) for controlling the speed of rotation of the brushless motor M.

The brushless motor control circuit assembly of the present invention has the following effects:

1. The field effect transistors QT of the output circuits 50 can be operated at the full conduction mode. As shown in FIG. 1, the booster and compensation circuit 11 raises the output voltage of the power supply circuit 10 to 170V for driving the field effect transistors QT of the output circuits 50 to the full conduction status, lowering the temperature of the field effect transistors QT.

Figures 2, 3:
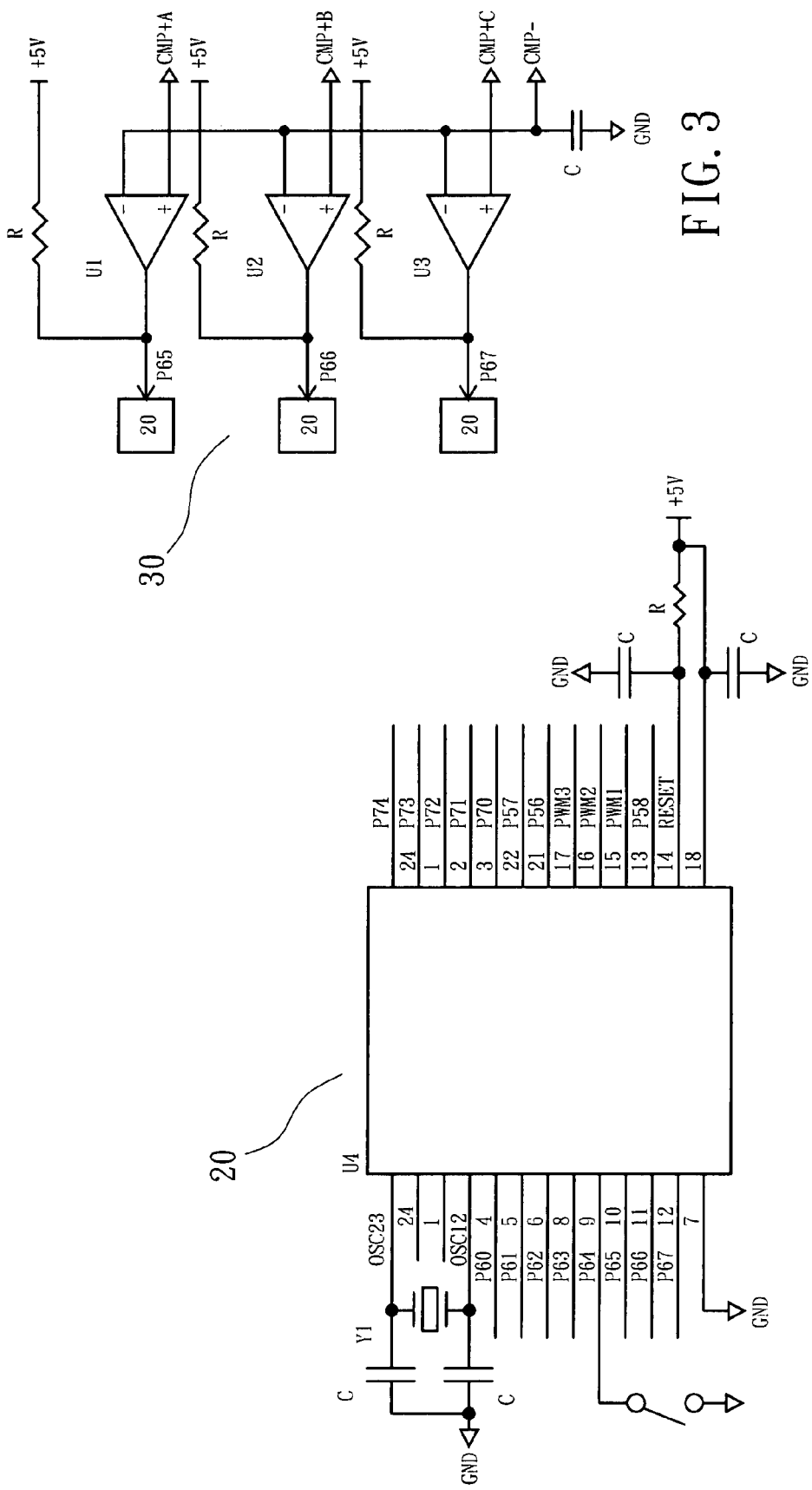
FIG. 2 is a circuit diagram of the circuitry of the microprocessor of the brushless motor control circuit assembly according to the present invention.
FIG. 3 is a circuit diagram of the circuitry of the back electromagnetic force sensor of the brushless motor control circuit assembly according to the present invention.
Figure 4:
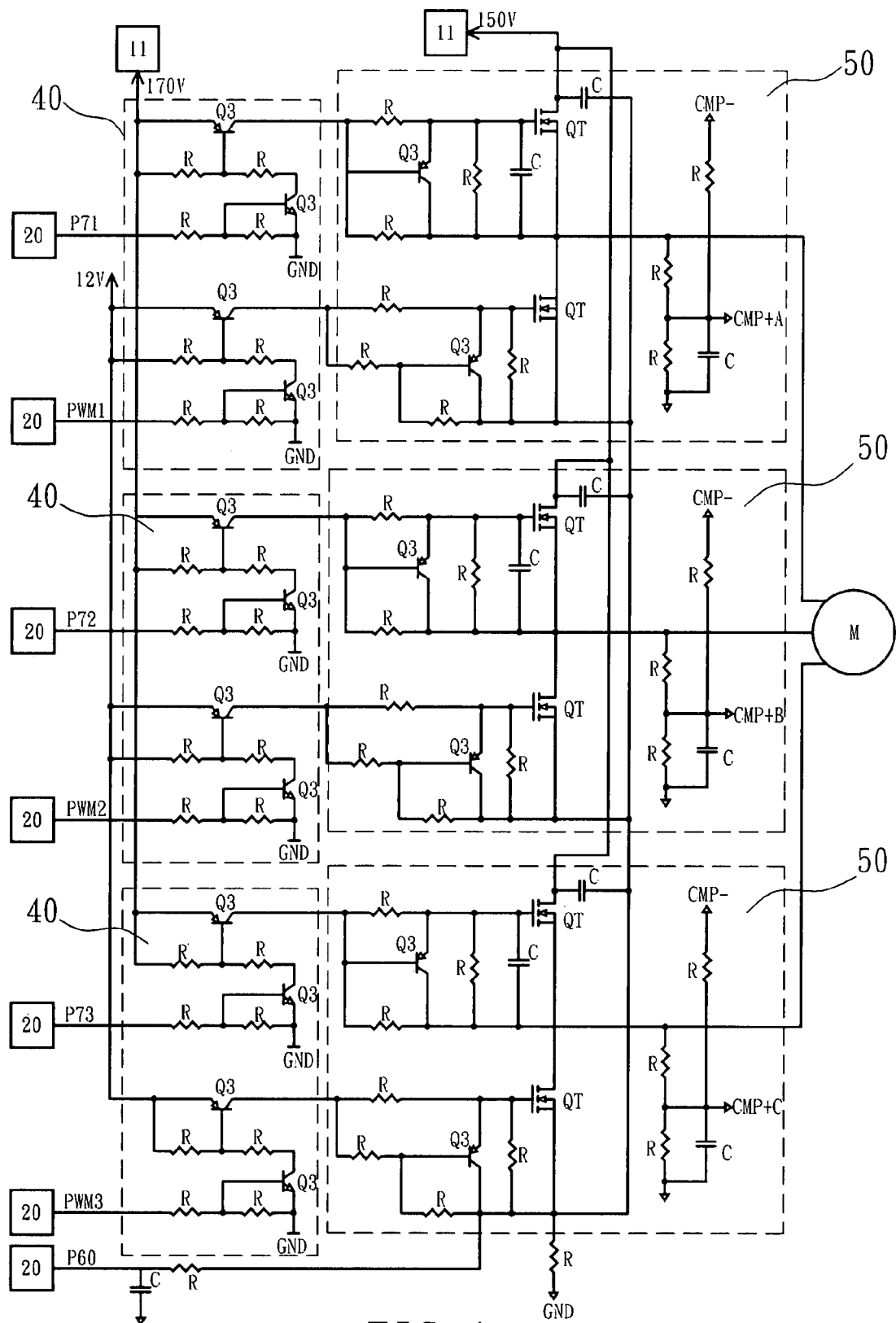
FIG. 4 is a circuit diagram of the circuitry of the driver circuit and output circuit of the brushless motor control circuit assembly according to the present invention.

2. Back electromagnetic force is detected for digital signal control. As shown in FIG. 3, the back electromagnetic force sensor 30 is comprised of three operation amplifiers U1, U2 and U3 that are electrically connected to the brushless motor M and the microprocessor 20 to detect the magnetic pole position of the rotor of the brushless motor M for further digital signal control, eliminating the drawback of the use of a Hall effect sensor as seen in the prior art design.

3. The brushless motor control circuit assembly has the characteristics of low operation noise. As shown in FIG. 1, the voltage regulator circuit 12 enables the microprocessor 20 to provide a reference voltage to the negative input end of the operation amplifier U by means of PWM (Pulse-width modulation) for controlling the speed of rotation of the brushless motor M. By means of voltage regulation to control the speed of rotation of the brushless motor M, the noise level is low.

Although a particular embodiment of the invention has been described in detail for purposes of illustration, various modifications and enhancements may be made without departing from the spirit and scope of the invention.

What the invention claimed is:

1. A brushless motor control circuit assembly installed in a ceiling fan to control the operation of a brushless motor of said ceiling fan, the brushless motor control circuit assembly being comprised of a power supply circuit, a booster and compensation circuit, a voltage regulator circuit, a microprocessor, a back electromagnetic force sensor, three driver circuits, and three output circuits, wherein:

said power supply circuit provides low voltage 12V/5V and high voltage 150V for the other circuitries of the brushless motor control circuit assembly;

said microprocessor has memory, computation, signal reading and pulse wave modulation functions, and is adapted to receive external control signals and to output set control signals to said driver circuits;

said booster and compensation circuit is comprised of a plurality of transistors, resistors, capacitors, and diodes, and adapted to raise the 12V output voltage of said power supply circuit to 170V for full conduction of field effect transistors of said output circuits;

said voltage regulator circuit is comprised of a first transistor, a second transistor, a plurality of resistors and capacitors, and an operation amplifier, the operation amplifier of said voltage regulator circuit obtaining a reference voltage for a negative input end thereof from said microprocessor and having a positive input end shunt to a regulated voltage output end by the resistors of said voltage regular circuit, said first transistor being turned on and said second transistor being turned off when the output of the operation amplifier of said voltage regulator circuit is high, said first transistor being turned off and said second transistor being turned on when the output of the operation amplifier of said voltage regulator circuit is low;

said back electromagnetic force sensor is comprised of three operation amplifiers that are electrically connected to said brushless motor and said microprocessor to detect the magnetic pole position of the rotor of said brushless motor for further control;

said driver circuits and said output circuits are electrically connected with each other, said driver circuits each comprising a plurality of transistors electrically connected to said microprocessor for enabling said microprocessor to simulate the phase of said brushless motor and to further control the output of said output circuits, said output circuits each comprising a plurality of field effect transistors that are electrically connected to said brushless motor for outputting control signals to said brushless motor to control forward/backward/stop modes of said brushless motor.

\* \* \* \* \*